United States Patent
Hirabayashi

(10) Patent No.: US 9,985,401 B2
(45) Date of Patent: May 29, 2018

(54) DIRECT CURRENT MOTOR

(71) Applicant: DENSO CORPORATION, Kariya, Aichi-pref. (JP)

(72) Inventor: Takashi Hirabayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 267 days.

(21) Appl. No.: 14/980,960

(22) Filed: Dec. 28, 2015

(65) Prior Publication Data

US 2016/0268751 A1 Sep. 15, 2016

(30) Foreign Application Priority Data

Mar. 13, 2015 (JP) .................................. 2015-050569

(51) Int. Cl.
| | | |
|---|---|---|
| H01R 39/38 | (2006.01) | |
| H02K 13/00 | (2006.01) | |
| H02K 23/02 | (2006.01) | |
| H02K 5/14 | (2006.01) | |
| H01R 39/41 | (2006.01) | |
| H02K 23/08 | (2006.01) | |

(52) U.S. Cl.
CPC ............ H01R 39/381 (2013.01); H02K 5/148 (2013.01); H02K 23/02 (2013.01); *H01R 39/38* (2013.01); *H01R 39/41* (2013.01); *H02K 23/08* (2013.01)

(58) Field of Classification Search
CPC .... H01R 39/38; H01R 39/381; H01R 39/383; H01R 39/385; H01R 39/40; H01R 39/41; H02K 11/40; H02K 13/00; H02K 13/006; H02K 23/18; H02K 5/14; H02K 5/143; H02K 5/148
See application file for complete search history.

(56) References Cited

U.S. PATENT DOCUMENTS

| | | | | |
|---|---|---|---|---|
| 4,437,230 A | * | 3/1984 | Greutmann | H02K 13/04 29/597 |
| 4,668,874 A | * | 5/1987 | Cresap | B60R 25/045 180/287 |
| 7,256,527 B2 | * | 8/2007 | Niimi | H01R 39/385 310/239 |
| 7,592,731 B2 | * | 9/2009 | Niimi | H02K 23/26 310/198 |
| 8,427,027 B2 | * | 4/2013 | Grabner | H01R 39/383 310/239 |

FOREIGN PATENT DOCUMENTS

KR 20130007793 A 1/2013

* cited by examiner

*Primary Examiner* — Burton Mullins
(74) *Attorney, Agent, or Firm* — Oliff PLC

(57) ABSTRACT

A brush holder has a core side position regulator engaged with a first connection plate to regulate a relative position. The core side position regulator has a projection part projected toward an armature core in the axial direction, and a fitting groove portion defined on both sides of the projection part in a circumferential direction. The relative position in the circumferential direction is regulated by an engagement between the projection part and a slit of the first connection plate. The relative position in the axial direction is regulated by an engagement between sides of the slit and the fitting groove portion. A width of the projection part in the circumferential direction is larger than a width of a brush in the circumferential direction.

10 Claims, 10 Drawing Sheets

DIRECT CURRENT MOTOR

CROSS REFERENCE TO RELATED APPLICATION

This application is based on Japanese Patent Application No. 2015-50569 filed on Mar. 13, 2015, the disclosure of which is incorporated herein by reference in its entirety.

TECHNICAL FIELD

The present disclosure relates to a direct current motor.

BACKGROUND

KR 2013007793A describes a six-pole magneto type direct-current motor. The direct-current motor has three plus side brushes and three minus side brushes arranged on the outer circumference of a cylindrical commutator. The brush is held by brush holder having a box shape, and pressurized to the commutator by a spring disposed in the brush holder.

The plus side brush and the minus side brush are electrically connected to a plus side connection plate and a minus side connection plate, respectively, through respective pigtail. That is, the plus side connection plate electrically connects the three plus side brushes, and the minus side connection plate electrically connects the three minus side brushes.

The brush holder is held between the plus side connection plate and the minus side connection plate which are arranged in the axial direction in parallel. The minus side connection plate is fixed to an end frame of a motor which forms a part of ground circuit. The plus side connection plate is arranged to an armature core side of the brush holder in the axial direction, and the minus side connection plate is arranged at the other side of the brush holder opposite from the armature core side in the axial direction.

SUMMARY

The six-pole magneto type direct-current motor needs the plus side connection plate that electrically connects the three plus side brushes. The plus side connection plate is arranged adjacent to the armature core with respect to the brush holder. However, a terminal area (riser) that connects each commutator segment to an armature coil is located adjacent to the armature core with respect to the brush holder. That is, the terminal area (end) of a segment is positioned on the armature core side in the axial direction, and a wire of the armature coil is connected to the terminal area. For this reason, when the plus side connection plate is arranged adjacent to the core side, it is necessary to take a space for securing electric insulation between the terminal area of a segment and the plus side connection plate, such that the full length of a motor becomes large.

It is an object of the present disclosure to provide a direct current motor in which a connection plate is arranged on the core side to electrically connect all of plus side brushes or all of minus side brushes, such that the full length of the direct current motor is made smaller in an axial direction while securing an insulation space between the terminal area of a commutator segment and the connection plate.

According to an aspect of the present disclosure, a direct current motor having at least four poles includes: a commutator having a cylindrical shape on an axis of an armature; a brush arranged on an outer circumference of the commutator; a brush holder holding the brush and having insulating properties and; a pressure component arranged in the brush holder to press the brush to the commutator; a first connection plate having conductive properties and arranged adjacent to a core of the armature in an axial direction, all of plus side brushes or all of minus side brushes of the brush being electrically connected to the first connection plate through a respective pigtail; and a second connection plate having conductive properties and arranged on the other side of the first connection plate through the brush holder, that is opposite from the core of the armature in the axial direction, all of the minus side brushes or all of the plus side brushes being electrically connected to the second connection plate through a respective pigtail.

The brush holder has an inner circumference opening opposing to the commutator in a radial direction, and an outer circumference wall surface that regulates an outer circumference position of the pressure component in the radial direction. The first connection plate and the second connection plate are arranged in the axial direction in parallel without electrically contacting, and the brush holder is held between the first connection plate and the second connection plate.

The first connection plate has a slit extending from the inner circumference or the outer circumference in the radial direction. The brush holder has a core side position regulator engaged to the first connection plate to regulate a relative position. The core side position regulator has a projection part projected to the core in the axial direction, and a fitting groove portion defined on both sides of the projection part in a circumferential direction. The relative position in the circumferential direction is regulated by the projection part engaged with the slit, and the relative position in the axial direction is regulated by an engagement between at least a part of sides of the slit in the circumferential direction and the fitting groove. A width of the projection part in the circumferential direction is larger than a width of the brush in the circumferential direction.

The circumferential width of the projection part inserted into the slit of the first connection plate is larger than the circumferential width of the brush. Therefore, the height of the brush holder having the projection part can be short in the axial direction on the core side. Accordingly, the position of the fitting groove portion of the brush holder can be shifted away from the core in the axial direction, and the position of the first connection plate fitted to the fitting groove portion can be brought close to the other side opposite from the core side. As a result, a distance between the first connection plate and the second connection plate can be made small in the axial direction. Thus, the full length of the motor can be short while securing the insulation space between a riser (terminal area connected to the armature coil) of a commutator segment and the first connection plate.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1A:
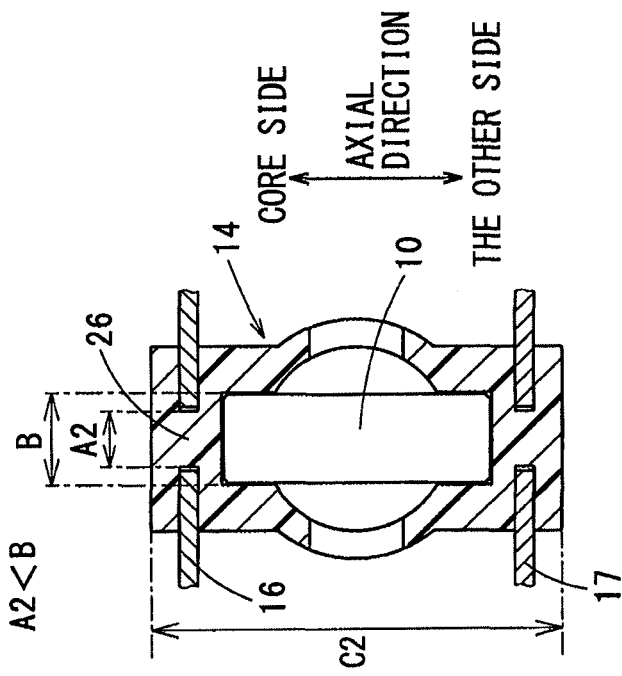
FIG. 1A is a sectional view illustrating a brush holder according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 5:
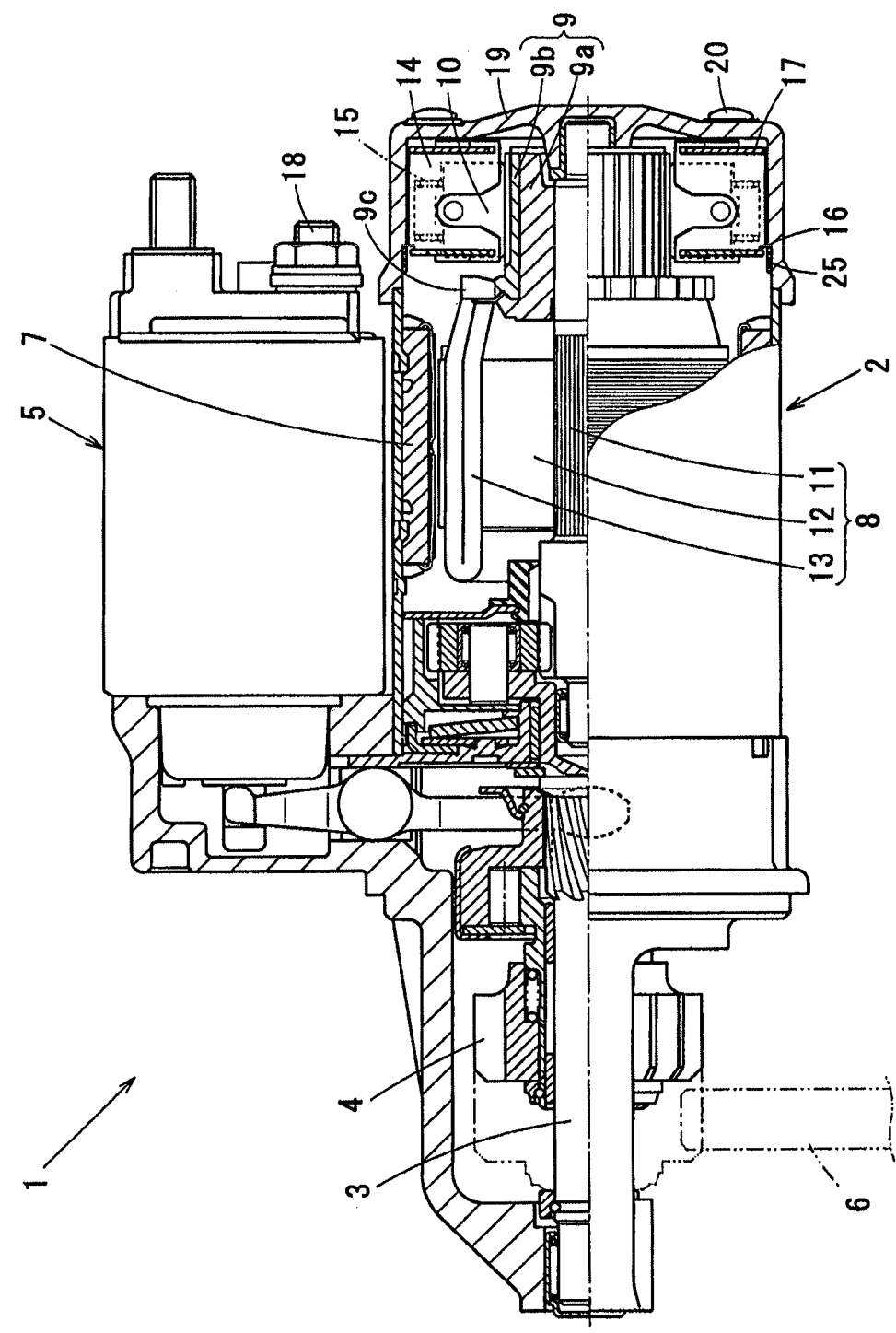
FIG. 5 is a sectional view of a starter of the first embodiment.

In a first embodiment, a direct-current motor is applied to a starter 1 for starting an internal combustion engine. As shown in FIG. 5, the starter 1 has a pinion 4 on an axis of an output shaft 3 which is rotated by a motor 2. The pinion 4 is pushed away from the motor 2 (leftward in FIG. 5) by the output shaft 3 using the attracting force of an electromagnetism switch 5 which includes a solenoid so as to engage with a ring gear 6 of the engine. This system is generally called as a pinion drive system. The motor 2 will be explained in detail hereafter, while the basic structure and operation of the starter 1 are generally known.

The motor 2 is a direct-current motor with four or more poles, in which a permanent magnet 7 is used for forming a magnetic field pole. For example, the number of poles may be six. The motor 2 has an armature 8, a commutator 9 and a brush 10. The armature 8 is arranged on the inner circumference of the magnetic field pole through an air gap. The commutator 9 has a cylindrical shape on the axis of the armature 8. The brush 10 is arranged on the outer circumference of the commutator 9.

The commutator 9 has an insulator base 9a and plural commutator segments 9b. The insulator base 9a has the shape of a cylinder, and is made of, for example, resin material. The commutator segments 9b are held by the insulator base 9a, and are arranged in a cylindrical shape. The insulator base 9a is fixed to the outer circumference of a shaft 11 of the armature 8 at the end portion by press fitting. The commutator segments 9b are mutually insulated from each other by the insulator base 9a. A coil 13 of the armature 8 is connected to a riser 9c (connector portion) of the commutator 9 at the end (left end of the commutator segments 9b in FIG. 5) adjacent to a core 12 of the armature 8 in the axial direction.

The brush 10 has three plus side brushes 10a and three minus side brushes 10b arranged at equal interval in the circumferential direction of the commutator 9. A brush ASSY shown in FIG. 2 includes a brush holder 14, a pressure component 15, a first connection plate 16, and a second connection plate 17 in addition to the brush 10.

The brush holder 14 is made of insulation component such as resin, for example, and has a box shape. The brush holder 14 has an inner circumference opening opposing to the commutator 9 in the radial direction, and a wall surface 14a (refer to FIG. 2) on the radially outer circumference surface.

Figure 3:
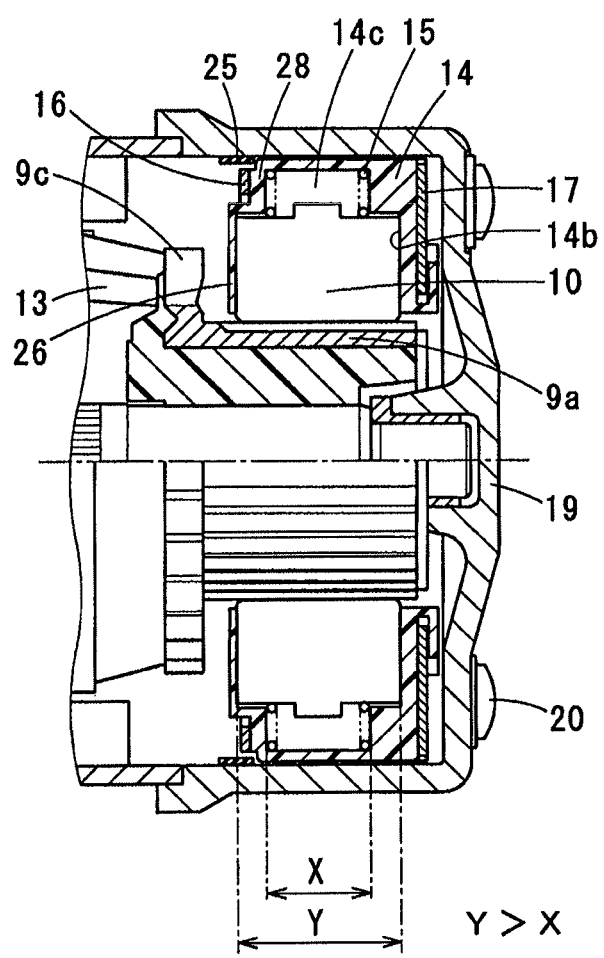
FIG. 3 is an enlarged sectional view illustrating a rear side of a motor of the first embodiment.

As shown in FIG. 3, the brush holder 14 has a brush storage chamber 14b which stores the brush 10 inside, and a pressure component storage chamber 14c which stores the pressure component 15 (on the outer circumference side in the radial direction). The brush storage chamber 14b is located between the commutator 9 and the pressure component storage chamber 14c.

The pressure component 15 may be a coil spring, for example, stored in the pressure component storage chamber 14c of the brush holder 14. The wall surface 14a of the brush holder 14 regulates the outer circumference position of the pressure component 15 in the radial direction, and the pressure component 15 presses the brush 10 to the commutator 9.

As shown in FIG. 3, the axial dimension X of the pressure component 15 (outer diameter of a coil spring) is smaller the axial length Y of the brush 10 in the axial direction. Further, the center of the pressure component 15 in the axial direction is located at approximately the same position as the center of the brush 10 in the axial direction.

Each of the first connection plate 16 and the second connection plate 17 is made of metal, and has a ring form with a center circular hole (opening) larger than the outer diameter of the commutator 9 at the central part in the radial direction. The first connection plate 16 and the second connection plate 17 are in parallel with each other and arranged in the axial direction without electrically contacting. The brush holder 14 is held between the first connection plate 16 and the second connection plate 17.

The first connection plate 16 is located adjacent to the armature core, and the second connection plate 17 is located on the other side opposite from the armature core through the first connection plate 16. In other words, the first connection plate 16 is located on the core side, and the second connection plate 17 is located on the other side. Hereafter, the core side in the axial direction is left side in FIG. 3 and close to the armature core 12 relative to the brush holder 14. The other side represents right side in FIG. 3 and far from the armature core 12.

The first connection plate 16 is electrically connected with a M terminal bolt 18 (refer to FIG. 5) of the electromagnetism switch 5 through a lead wire (not shown). The second connection plate 17 is fixed to the end frame 19 of the motor 2 with the bolt 20, and is electrically connected with the end frame 19. The end frame 19 may correspond to a motor case which forms a part of a ground circuit.

Figure 2:
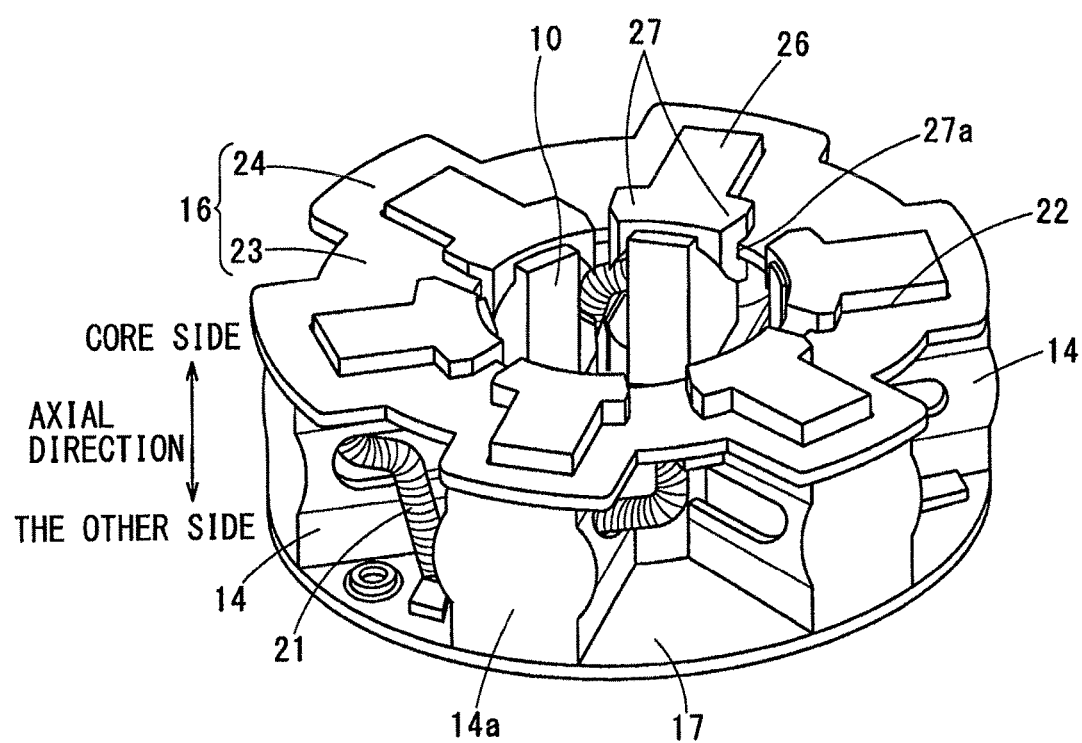
FIG. 2 is a perspective view illustrating a brush ASSY of the first embodiment.

As shown in FIG. 2, each of the three plus side brushes 10a is electrically connected to a surface of the first connection plate 16 opposite from the armature core through a pigtail 21. Each of the three minus side brushes 10b is electrically connected to a core-side surface of the second connection plate 17 through a pigtail 21.

Each of the first connection plate 16 and the second connection plate 17 has plural slits 22 at positions where the brush holder 14 is arranged. The slit 22 is opened at the inner circumference of the first connection plate 16, and extends from the inner circumference outward in the radial direction of the first connection plate 16 and the second connection plate 17. A flat part 23 is defined between the adjacent slits 22 in the circumferential direction, and has a width in the radial direction that is approximately the same as the length of the slit 22 in the radial direction.

As shown in FIG. 2, the first connection plate 16 has a spreading part 24 which electrically connects the adjacent flat parts 23 at the both sides of the slit 22 in the circumferential direction. The spreading part 24 is defined on the same plane as the flat part 23, and extends around the radially outer side of the slit 22. The both sides of the spreading part 24 in the circumferential direction are connected with the respective flat parts 23.

That is, the radially outer circumference of the slit 22 is not opened from the outer circumference of the first connection plate 16, and is closed by the spreading part 24. Because the first connection plate 16 has the spreading part 24 on the radially outer side of the outer circumference of the flat part 23 in the radial direction, an interval space between the outer circumference of the spreading part 24 and the inner circumference of the end frame 19 becomes small in the radial direction. As shown in FIG. 3, an insulation component 25 having a ring shape is arranged between the outer circumference of the spreading part 24 and the end frame 19 to secure the insulation.

Hereafter, the core-side form of the brush holder 14 attached to the first connection plate 16 is explained in detail. The brush holder 14 has a core side position regulator which is attached to the first connection plate 16 to regulate a relative position of the brush holder 14 with respect to the first connection plate 16. As shown in FIG. 2, the core side position regulator has a projection part 26 which regulates the relative position relative to the first connection plate 16 in the circumferential direction, and a plate fitting part 27 which regulates the relative position relative to the first connection plate 16 in the axial direction and the radial direction (outward in the radial direction).

The projection part 26 is projected toward the armature core 12 in the axial direction, and corresponds to the brush storage chamber 14b. When attaching the brush holder 14 to the first connection plate 16, the projection part 26 is inserted into the slit 22 of the first connection plate 16.

Figure 1B:
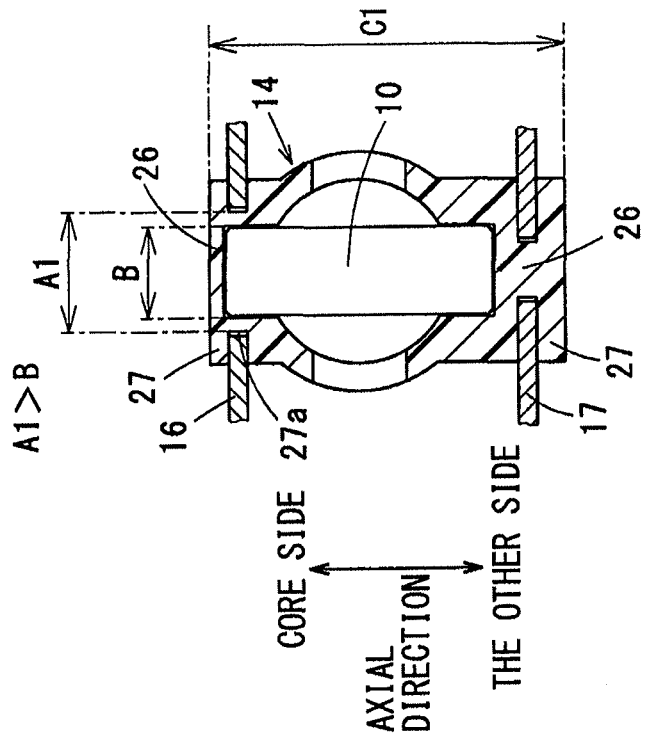
FIG. 1B is a sectional view of a brush holder of a comparison example.

As shown in FIG. 1A, the width A1 of the projection part 26 in the circumferential direction is larger than the width B of the brush 10 in the circumferential direction. In contrast, in a brush holder 14 of a comparison example represented in FIG. 1B, the width A2 of the projection part 26 in the circumferential direction is smaller than the width B of the brush 10 in the circumferential direction. FIG. 1A is a sectional view taken along a line Ia-Ia in FIG. 4A according to the first embodiment, and FIG. 1B is a sectional view taken along a line Ib-Ib in FIG. 4B of the comparison example.

As shown in FIG. 2, the plate fitting part 27 has a fitting groove portion 27a on both sides of the brush storage chamber 14b in the circumferential direction, while the brush storage chamber 14b is opened on the inner circumference of the brush holder 14. As shown in FIG. 1A and FIG. 2, the fitting groove portion 27a has U-shape in the cross-section. In other words, the groove is opened to the outer circumference side in the radial direction, and is recessed inward in the radial direction. Further, the groove is opened to the outer side (opposite to the projection part) in the circumferential direction. When the projection part 26 is inserted into the slit 22 of the first connection plate 16, both sides of the slit 22 in the circumferential direction are fitted to the fitting groove portion 27a, at the inner circumference side.

As shown in FIG. 1A, the fitting groove portion 27a is formed at the position to overlap with the core-side end portion (upper end portion) of the brush 10, which is stored in the brush storage chamber 14b, in the axial direction. That is, in the state where the brush holder 14 is attached to the first connection plate 16, the first connection plate 16 oppose to the core-side end portion of the brush 10 in the circumference direction.

The projection part 26 has a step part 28 (refer to FIG. 3) at the both sides of the projection part 26 in the circumferential direction and the radially outer side of the projection part 26, except the plate fitting part 27. A level difference is defined between the projection part 26 and the step part 28. The height of the step part 28 is lower than that of the projection part 26 on the core side in the axial direction. However, on the other side opposite from the core side, the surface of the fitting groove portion 27a is formed to have the same height as the step part 28. The height on the core side in the axial direction means an axial distance from the same position in the axial direction (for example, the axial center of the brush holder 14) to the core side in the axial direction.

The step part 28 is formed because the dimension X of the pressure component 15 in the axial direction is smaller than the length Y of the brush 10 in the axial direction. That is, the level difference is formed between the projection part 26 and the step part 28 according to the vertical interval between the core side end surface of the brush storage chamber 14b and the core side end surface of the spring storage chamber 14c in the axial direction. The dimension of the level difference in the axial direction (height difference between the step part 28 and the projection part 26 in the axial direction) is larger than the thickness of the first connection plate 16.

The relative position of the brush holder 14 relative to the first connection plate 16 in the circumferential direction is regulated by inserting the projection part 26 into the slit 22. The relative position of the brush holder 14 relative to the first connection plate 16 in the axial direction and the radial direction are regulated by the engagement between the inner circumference side (inner circumference of both sides of the slit 22 in the circumferential direction) of the first connection plate 16 and the fitting groove portion 27a.

As shown in FIG. 1A, the brush holder 14 has the other side position regulator with the projection part 26 and the plate fitting part 27, on the other side in the axial direction, similarly to the core side in the axial direction. The relative position with respect to the second connection plate 17 is regulated by the other side position regulator. However, the relationship between the width A1 of the projection part 26 in the circumferential direction and the width B of the brush 10 in the circumferential direction does not need to be the same as that of the core side. That is, A1<B may be possible on the other side.

Figure 4A:
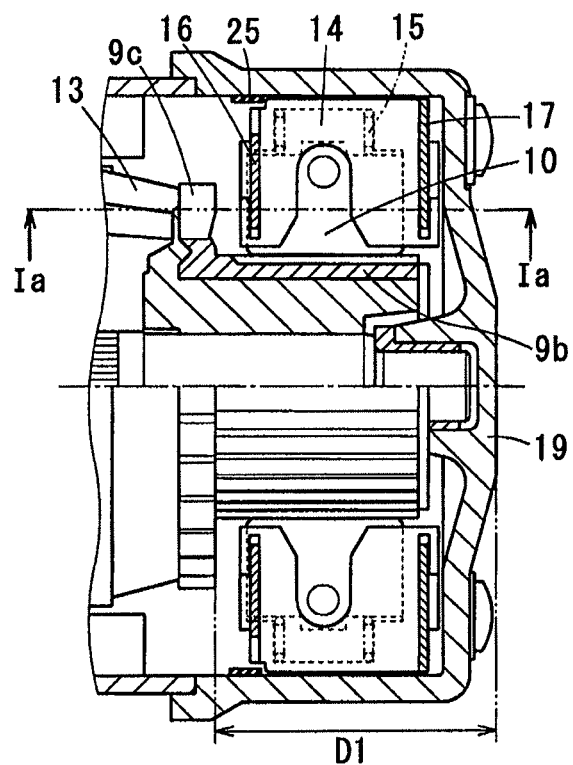
FIG. 4A is a view illustrating the rear side of the motor of the first embodiment.
Figure 4B:
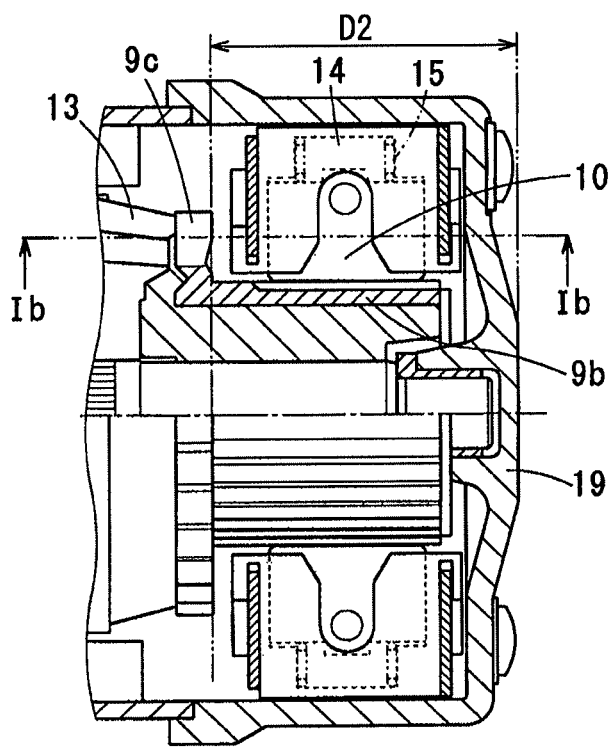
FIG. 4B is a view of a rear side of a motor of the comparison example.

According to the first embodiment, as shown in FIG. 1A, since the width A1 of the projection part 26 in the circumferential direction is larger than the width B of the brush 10 in the circumferential direction, in the brush holder 14 formed on the core side in the axial direction. Therefore, compared with the height C2 in the comparison example shown in the FIG. 1B, the height C1 of the brush holder 14 of the first embodiment can be short in the axial direction. Specifically, the height of the projection part 26 and the plate fitting part 27 is made short on the core side in the axial direction in FIG. 1A, compared with FIG. 1B, such that the fitting groove portion 27a of the plate fitting part 27 can be made to overlap with the core side end portion of the brush 10 stored in the brush storage chamber 14 in the axial direction. Thus, the distance between the first connection plate 16 and the second connection plate 17 in the axial direction can be made small. Accordingly, the full length D1 of the motor of the first embodiment in FIG. 4A can be shorter than the full length D2 of the motor of the comparison example in FIG. 4B. Here, FIG. 4A is view of a rear side of the motor 2 with the brush ASSY of the first embodiment, and FIG. 4B is a view of a rear side of a motor 2 with a brush ASSY of the comparison example.

According to the first embodiment, the spreading part 24 of the first connection plate 16 is formed on the same plane as the flat part 23. Further, the spreading part 24 of the first connection plate 16 is arranged on the core-side surface of the step part 28 of the brush holder 14 formed on the core side. That is, the spreading part 24 is formed to overlap with the projection part 26 of the brush holder 14 in the axial direction. In other words, the spreading part 24 is not located on the core side of the projection part 26 in the axial direction. Therefore, the full length of the motor 2 is not affected, because it is not necessary to prepare a space for arranging the spreading part 24 in the axial direction.

Second Embodiment

Figure 6:
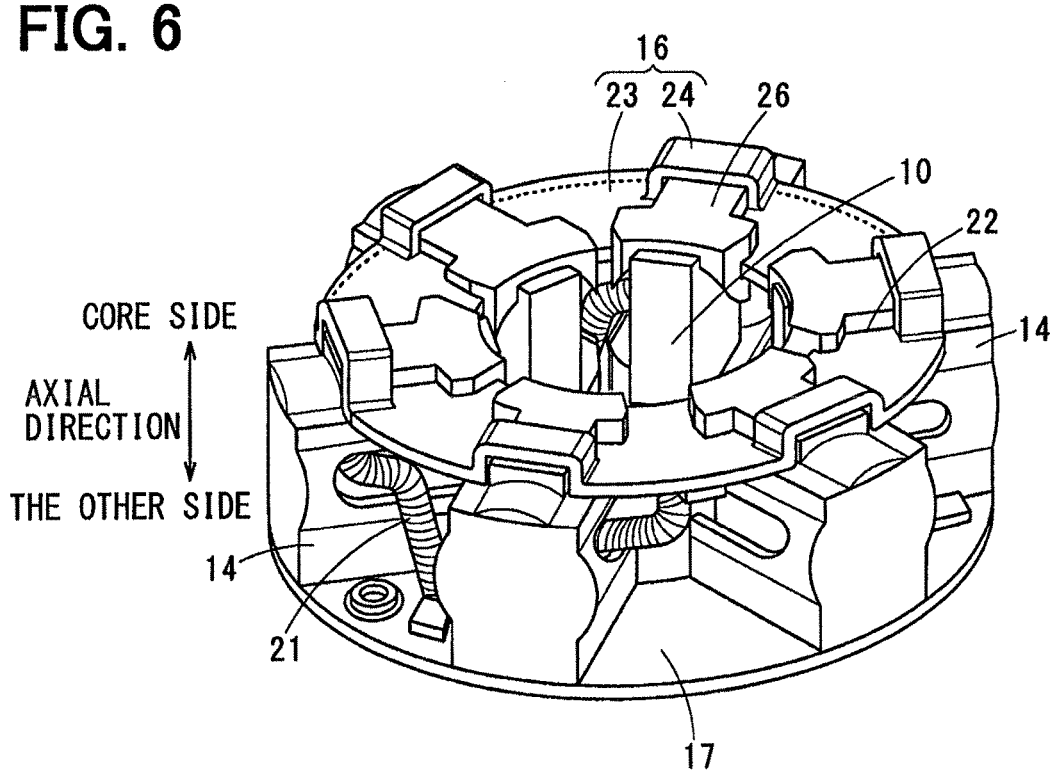
FIG. 6 is a perspective view illustrating a brush ASSY according to a second embodiment.

The spreading part 24 of the first connection plate 16 is modified in a second embodiment. As shown in FIG. 6, the spreading part 24 is formed to project to the core side in the axial direction, relative to the first connection plate 16, when extending over the slit 22 in the circumferential direction. Specifically, when inserting the projection part 26 of the brush holder 14 into the slit 22, the spreading part 24 may not interfere with the projection part 26 due to a shape of a tunnel over the slit 22.

The spreading part 24 is not projected from the outer circumference of the flat part 23 outward in the radial direction, and is positioned within the outer diameter of the flat part 23, such that an insulation component 25 of the first embodiment is unnecessary. Moreover, the spreading part 24 is formed on the outer circumference side of the riser 9c of the commutator segment 9b in the radial direction. Therefore, sufficient insulation distance is secured relative to the armature coil 13 or the riser 9c, while the spreading part 24 has the shape of tunnel projected to the core side in the axial direction. The other structure in the second embodiment is the same as the first embodiment, so the full length of the motor 2 can be shortened similarly to the first embodiment.

Third Embodiment

Figure 7:
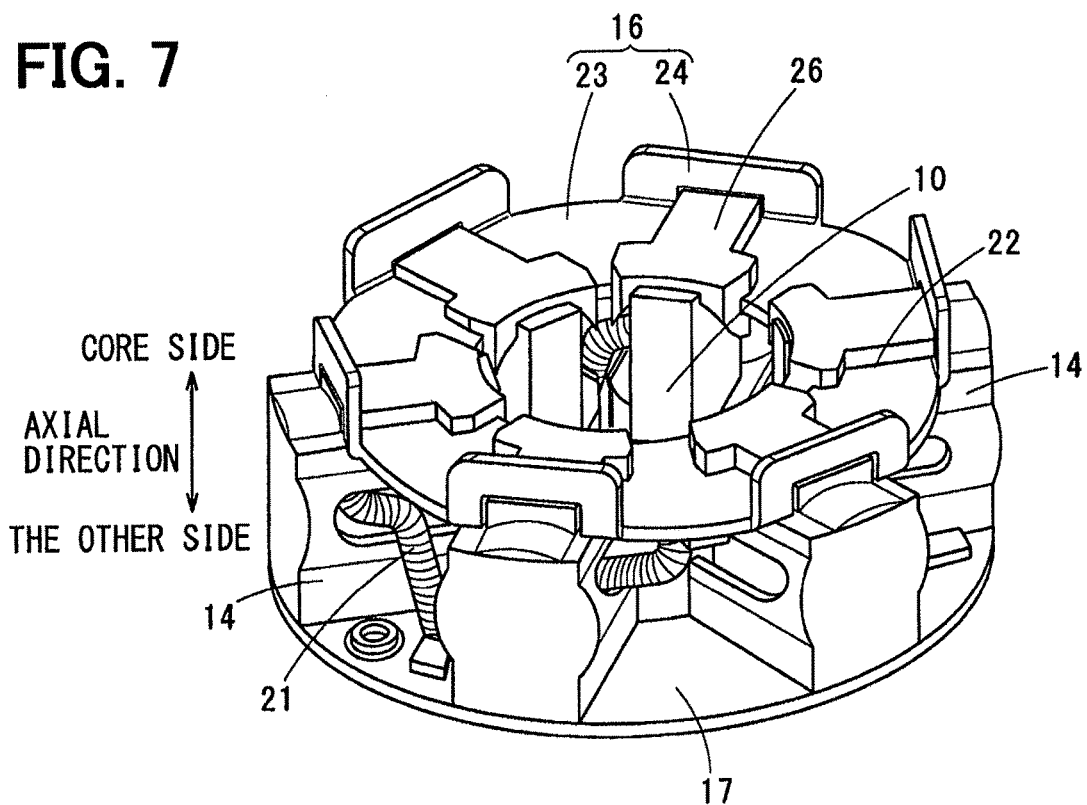
FIG. 7 is a perspective view illustrating a brush ASSY according to a third embodiment.

The spreading part 24 of the first connection plate 16 is modified in a third embodiment. As shown in FIG. 7, the spreading part 24 is bent to the core side in the axial direction relative to the flat part 23 of the first connection plate 16 at approximately 90 degrees. In this case, as well as the second embodiment, the spreading part 24 is not projected outward from the outer diameter of the flat part 23, so the insulation component 25 is unnecessary. Moreover, the spreading part 24 is located on the outer circumference side of the riser 9c of the commutator segment 9b in the radial direction. Therefore, sufficient insulation distance is secured relative to the armature coil 13 or the riser 9c, while the spreading part 24 is bent by about 90 degrees to the core side in the axial direction.

According to the third embodiment, the full length of the motor 2 can be shortened similarly to the first embodiment, since the other structure in the third embodiment is the same as the first embodiment.

Fourth Embodiment

Figure 8:
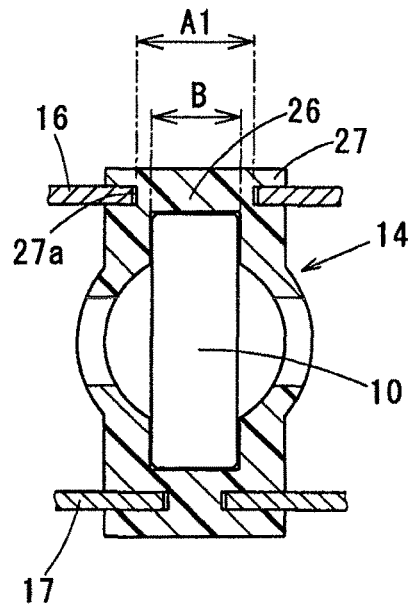
FIG. 8 is a sectional view illustrating a brush holder according to a fourth embodiment.

In a fourth embodiment, the fitting groove portion 27a of the plate fitting part 27 of the brush holder 14 does not overlap with the core-side end portion of the brush 10 in the axial direction, in contrast to the first embodiment. As shown in FIG. 8, the fitting groove portion 27a and the core-side end portion of the brush 10 do not oppose to each other in the circumference direction.

As well as the first embodiment, the width A1 of the projection part 26 in the circumferential direction is larger than the width B of the brush 10 in the circumferential direction, while the projection part 26 is formed on the core side of the brush holder 14 in the axial direction. For this reason, the height of the projection part 26 and the plate fitting part 27 on the core side in the axial direction can be made small, while the fitting groove portion 27a and the core-side end portion of the brush 10 do not overlap in the axial direction. Therefore, the axial length of the brush holder 14 can be made small. As a result, the distance between the first connection plate 16 and the second connection plate 17 in the axial direction can be made small, compared with the comparison example shown in FIG. 1B, such that the full length of the motor 2 can be shortened.

Fifth Embodiment

Figure 9:
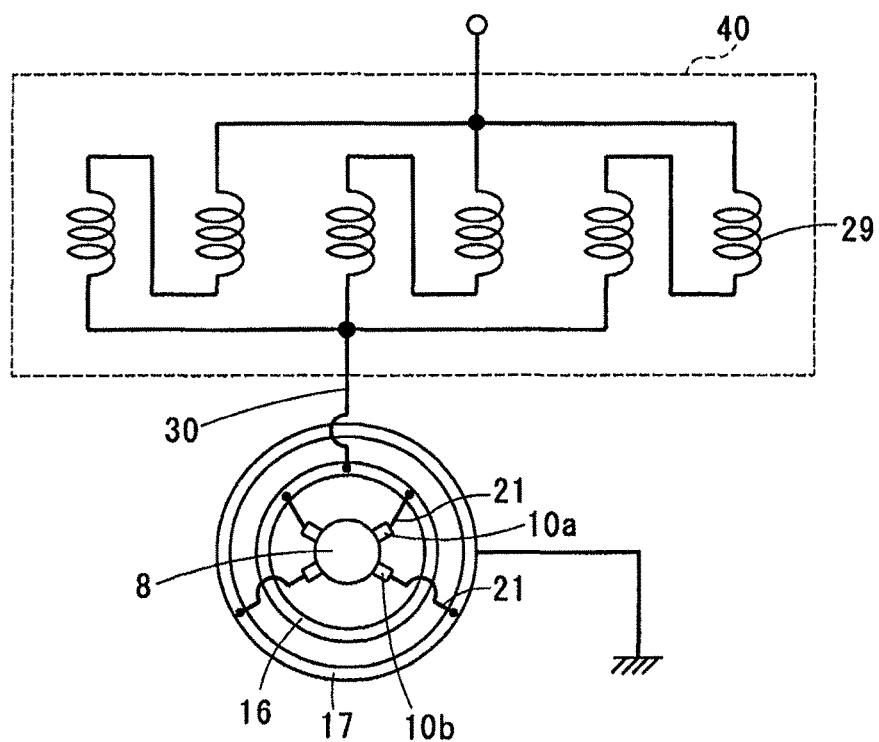
FIG. 9 is a wire connection view between a magnetic field coil of a motor and an armature according to a fifth embodiment.

In a fifth embodiment, the motor 2 has an electromagnet magnetic field 40. As shown in FIG. 9, the motor 2 has magnetic field coils 29 energized to form magnetic field poles as electromagnet magnetic field 40, and the armature 8 in which the coil 13 is wave-wound. The magnetic field coil 29 is connected with the armature coil 13 in series. Moreover, the number of the brushes (the core-side brushes 10) connected to the first connection plate 16 through the pigtail 21 is less than one half of the number of magnetic field poles. In FIG. 9, the number of the brushes 10a connected to the first connection plate 16 through the pigtail 21 is two. Furthermore, the magnetic field coil 29 and the first connection plate 16 are electrically connected with each other through one lead 30.

The wire connection can be easily made even while the terminal number of the magnetic field coils 29 connected to the first connection plate 16 differs from the number of the core side brushes 10. For example, the number of the core side brushes 10 can be reduced to two (or one) relative to six magnetic field poles system in which the magnetic field coils 29 are connected as two-serial and three-parallel in FIG. 9.

Figure 10:
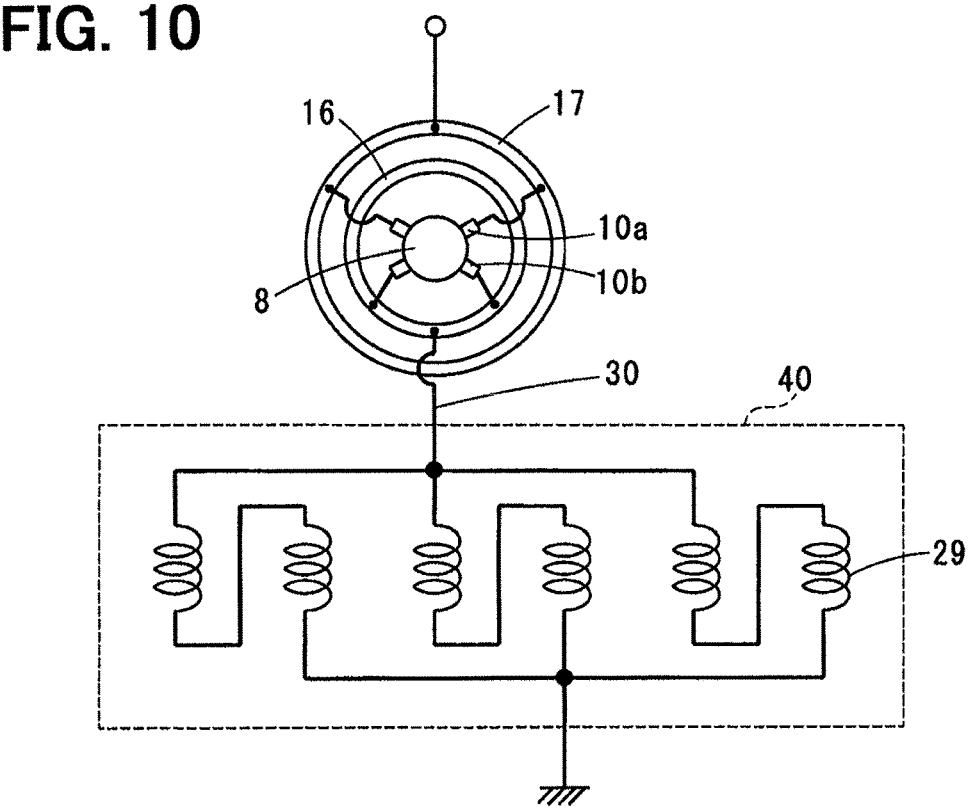
FIG. 10 is a wire connection view between a magnetic field coil of a motor and an armature according to a fifth embodiment.

FIG. 9 shows an example of series winding type motor 2. Alternatively, the present disclosure may be applied to a composite winding type motor, in which the magnetic field coil 29 and the armature coil 13 are connected in serial-parallel. The core-side brush 10 is not limited to the plus side brush 10a, and may be the minus side brush 10b. For example, as shown in FIG. 10, when the magnetic field coil 29 is connected to the ground side with respect to the armature 8, the minus side brush 10b is connected to the first connection plate 16, and the plus side brush 10a is connected to the second connection plate 17.

Sixth Embodiment

Figure 11:
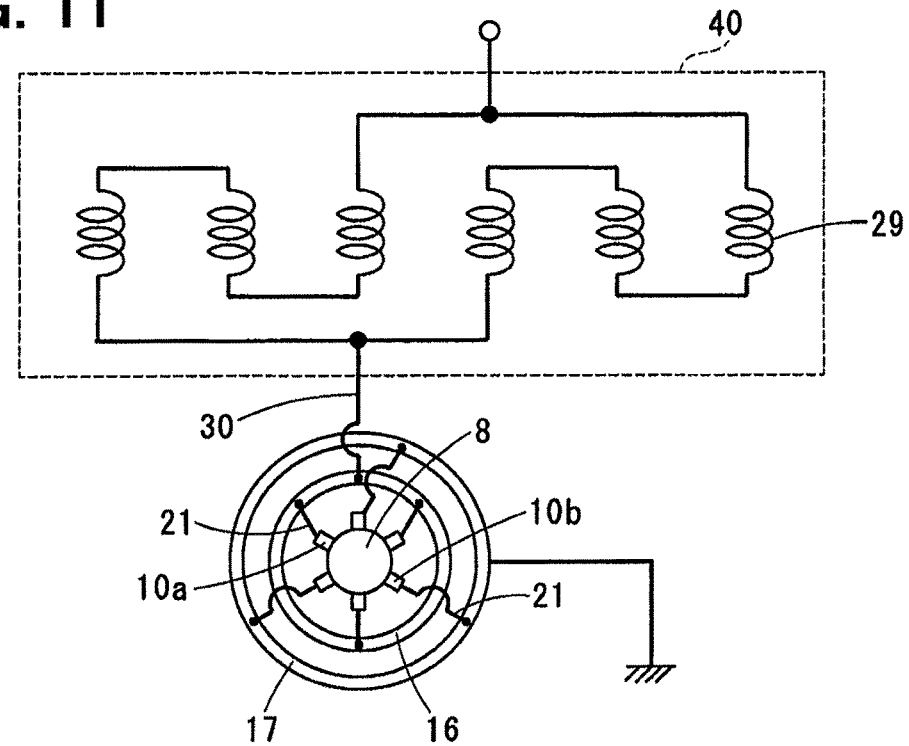
FIG. 11 is a wire connection view between a magnetic field coil of a motor and an armature according to a sixth embodiment.

In a sixth embodiment, the motor 2 has an electromagnet magnetic field 40, in which all the magnetic field coils 29 are connected in series or two-parallel. FIG. 11 represents an example of the magnetic field 40 with six-pole, thee-serial, and two-parallel.

Figure 13:
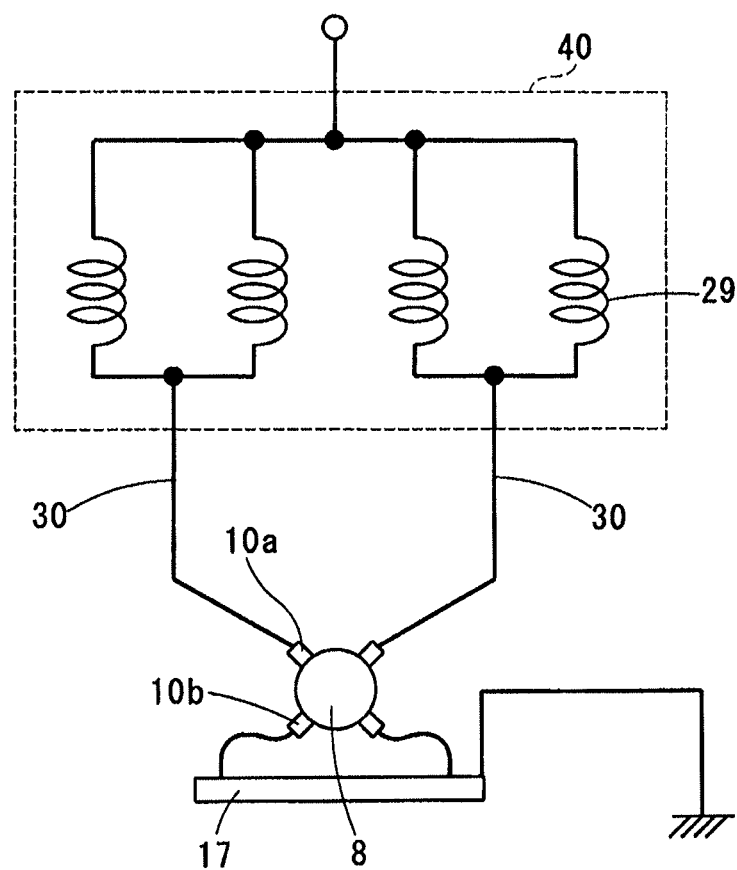
FIG. 13 is a wire connection view of a general direct-current motor.

FIG. 13 represents a conventionally well-known direct-current motor with an electromagnet magnetic field 40, and each plus side brush 10a is connected with the magnetic field coil 29 through the respective lead 30. For this reason, the number of the leads 30 needs the same number as the plus side brushes 10a. In FIG. 13, the number of the leads 30 is two.

In contrast, as shown in FIG. 11, according to the motor 2 of the sixth embodiment, the magnetic field coil 29 and the first connection plate 16 can be connected with one lead 30 regardless of the number of the core side brushes 10. The motor 2 can be produced at low cost with the minimum number of components.

Figure 12:
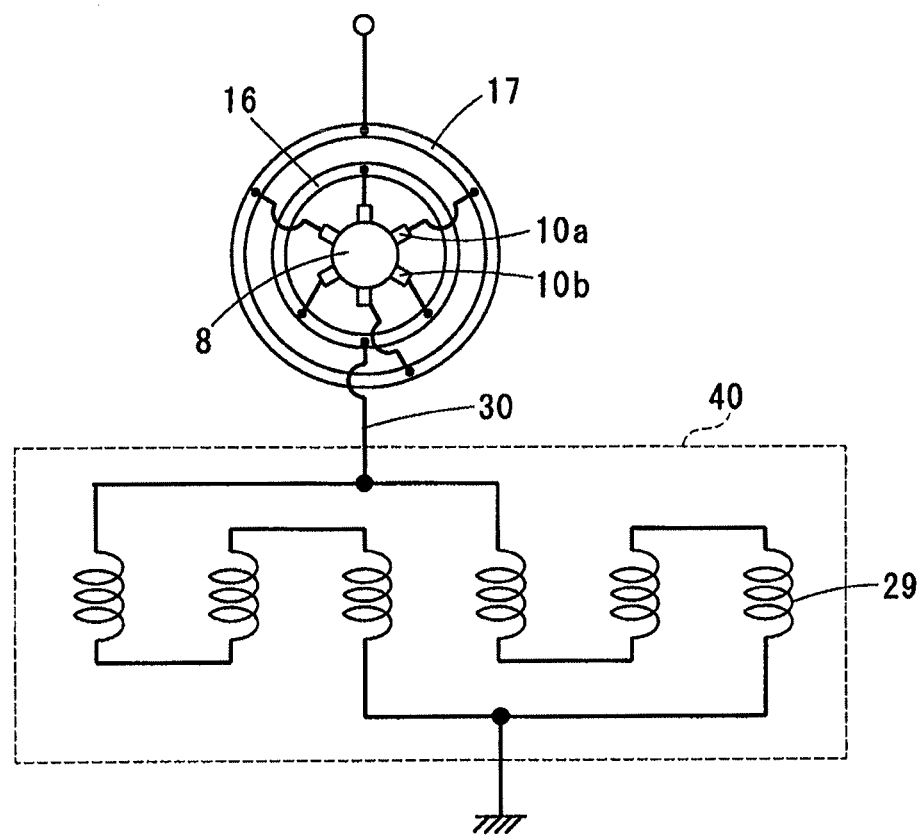
FIG. 12 is a wire connection view between a magnetic field coil of a motor and an armature according to a sixth embodiment.

As shown in FIG. 12, the magnetic field coil 29 may be connected to the ground side relative to the armature 8 in the sixth embodiment. In this case, the minus side brush 10b is connected to the first connection plate 16, and the plus side brush 10a is connected to the second connection plate 17.

MODIFICATION

The plus side brushes 10a are connected to the first connection plate 16 and the minus side brushes 10b are connected to the second connection plate 17 in the first embodiment. Alternatively, the plus side brushes 10a may be connected to the second connection plate 17, and the minus side brushes 10b may be connected to the first connection plate 16. However, it is necessary to electrically insulate between the second connection plate 17 and the end frame 19 when the second connection plate 17 is fixed to the end frame 19 of the motor 2.

Similarly to the core side, the projection part 26 of the brush holder 14 may be inserted into the slit 22 of the second connection plate 17 on the other side of the brush holder 14 in the axial direction. Alternatively, the projection part 26 may be press-fitted into the slit 22 in the axial direction.

Such changes and modifications are to be understood as being within the scope of the present disclosure as defined by the appended claims.

What is claimed is:

1. A direct current motor having at least four poles comprising:
   a commutator having a cylindrical shape on an axis of an armature;
   a brush arranged on an outer circumference of the commutator;
   a brush holder holding the brush and having insulating properties and;
   a pressure component arranged in the brush holder to press the brush to the commutator;
   a first connection plate having conductive properties and arranged adjacent to a core of the armature in an axial direction, all of plus side brushes or all of minus side brushes of the brush being electrically connected to the first connection plate through a respective pigtail; and
   a second connection plate having conductive properties and arranged opposite from the core of the armature through the first connection plate in the axial direction, all of the minus side brushes or all of the plus side brushes being electrically connected to the second connection plate through a respective pigtail, wherein
   the brush holder has an inner circumference opening opposing to the commutator in a radial direction, and an outer circumference wall surface that regulates an outer circumference position of the pressure component in the radial direction,
   the first connection plate and the second connection plate are arranged in the axial direction in parallel without electrically contacting, the brush holder being held between the first connection plate and the second connection plate,
   the first connection plate has a slit extending from the inner circumference or the outer circumference in the radial direction,
   the brush holder has a core side position regulator engaged with the first connection plate to regulate a relative position,
   the core side position regulator has
      a projection part projected toward the core of the armature in the axial direction, and
      a fitting groove portion defined on both sides of the projection part in a circumferential direction,
   the relative position in the circumferential direction is regulated by an engagement between the projection part and the slit,
   the relative position in the axial direction is regulated by an engagement between at least a part of sides of the slit in the circumferential direction and the fitting groove portion,
   a width of the projection part in the circumferential direction is larger than a width of the brush in the circumferential direction, and
   the first connection plate overlaps with an end portion of the brush adjacent to the core of the armature in the axial direction in a state where the brush holder that holds the brush is attached to the first connection plate.

2. The direct current motor according to claim 1, wherein the commutator includes
   a plurality of commutator segments insulated from each other and arranged in a cylindrical state, and
   a connector portion that is an end of the respective commutator segments, the connector portion being located adjacent to the core of the armature in the axial direction, an armature coil of the armature being electrically connected to the connector portion, and
   the first connection plate has a spreading part which connects the sides of the slit with each other in the circumferential direction at a position on an outer side of an outer circumference of the connector portion in the radial direction.

3. The direct current motor according to claim 2, wherein all of the plus side brushes are electrically connected to the first connection plate which has the spreading part, and
all of the minus side brushes are electrically connected to the second connection plate.

4. The direct current motor according to claim 3, wherein the second connection plate is directly fixed to a motor case which forms a part of ground circuit, and is electrically connected with the motor case.

5. The direct current motor according claim 1, further comprising:
an armature in which a coil is wave-wound around a core, and
a magnetic field coil connected to the coil of the armature in series or serial-parallel, the magnetic field coil being energized to form magnetic field poles, wherein
the number of the brushes connected to the first connection plate through the pigtail is less than one half of the number of the magnetic field poles, and
the magnetic field coil and the first connection plate are electrically connected.

6. The direct current motor according to claim 1, further comprising:
a plurality of magnetic field coil that are energized to form magnetic field poles, wherein
the magnetic field coils are connected in series or two-parallel, and
the magnetic field coils and the first connection plate are electrically connected with each other.

7. A direct current motor having at least four poles comprising:
a commutator having a cylindrical shape on an axis of an armature;
a brush arranged on an outer circumference of the commutator;
a brush holder holding the brush and having insulating properties and;
a pressure component arranged in the brush holder to press the brush to the commutator;
a first connection plate having conductive properties and arranged adjacent to a core of the armature in an axial direction, all of plus side brushes or all of minus side brushes of the brush being electrically connected to the first connection plate through a respective pigtail; and
a second connection plate having conductive properties and arranged opposite from the core of the armature through the first connection plate in the axial direction, all of the minus side brushes or all of the plus side brushes being electrically connected to the second connection plate through a respective pigtail, wherein
the brush holder has an inner circumference opening opposing to the commutator in a radial direction, and an outer circumference wall surface that regulates an outer circumference position of the pressure component in the radial direction,
the first connection plate and the second connection plate are arranged in the axial direction in parallel without electrically contacting, the brush holder being held between the first connection plate and the second connection plate,
the first connection plate has a slit extending from the inner circumference or the outer circumference in the radial direction,
the brush holder has a core side position regulator engaged with the first connection plate to regulate a relative position,
the core side position regulator has
a projection part projected toward the core of the armature in the axial direction, and
a fitting groove portion defined on both sides of the projection part in a circumferential direction,
the relative position in the circumferential direction is regulated by an engagement between the projection part and the slit,
the relative position in the axial direction is regulated by an engagement between at least a part of sides of the slit in the circumferential direction and the fitting groove portion,
a width of the projection part in the circumferential direction is larger than a width of the brush in the circumferential direction,
the commutator includes
a plurality of commutator segments insulated from each other and arranged in a cylindrical state, and
a connector portion that is an end of the respective commutator segments, the connector portion being located adjacent to the core of the armature in the axial direction, an armature coil of the armature being electrically connected to the connector portion,
the first connection plate has a spreading part which connects the sides of the slit with each other in the circumferential direction at a position on an outer side of an outer circumference of the connector portion in the radial direction,
the brush holder has a step part located on an outer side of the projection part in the radial direction and located adjacent to the core of the armature in the axial direction,
a level difference is defined between the step part and the projection part, a height of the step part being lower than that of the projection part in the axial direction, and
the spreading part is arranged on a surface of the step part adjacent to the core of the armature in a state where the brush holder is attached to the first connection plate.

8. The direct current motor according to claim 7, wherein
the pressure component has a dimension in the axial direction, and the dimension of the pressure component is smaller than a length of the brush in the axial direction,
the brush holder has
a brush storage chamber that stores the brush, the brush storage chamber being opened to the inner circumference in the radial direction, and
a pressure component storage chamber that stores the pressure component, the brush being located between the commutator and the pressure component storage chamber,
the projection part is formed to correspond to the brush storage chamber on a side adjacent to the core of the armature in the axial direction, and
the step part is formed to correspond to the pressure component storage chamber on a side adjacent to the core of the armature in the axial direction.

9. A direct current motor having at least four poles comprising:
a commutator having a cylindrical shape on an axis of an armature;
a brush arranged on an outer circumference of the commutator;
a brush holder holding the brush and having insulating properties and;
a pressure component arranged in the brush holder to press the brush to the commutator;
a first connection plate having conductive properties and arranged adjacent to a core of the armature in an axial direction, all of plus side brushes or all of minus side brushes of the brush being electrically connected to the first connection plate through a respective pigtail; and
a second connection plate having conductive properties and arranged opposite from the core of the armature through the first connection plate in the axial direction, all of the minus side brushes or all of the plus side brushes being electrically connected to the second connection plate through a respective pigtail, wherein
the brush holder has an inner circumference opening opposing to the commutator in a radial direction, and an outer circumference wall surface that regulates an outer circumference position of the pressure component in the radial direction,
the first connection plate and the second connection plate are arranged in the axial direction in parallel without electrically contacting, the brush holder being held between the first connection plate and the second connection plate,
the first connection plate has a slit extending from the inner circumference or the outer circumference in the radial direction,
the brush holder has a core side position regulator engaged with the first connection plate to regulate a relative position,
the core side position regulator has
  a projection part projected toward the core of the armature in the axial direction, and
  a fitting groove portion defined on both sides of the projection part in a circumferential direction,
the relative position in the circumferential direction is regulated by an engagement between the projection part and the slit,
the relative position in the axial direction is regulated by an engagement between at least a part of sides of the slit in the circumferential direction and the fitting groove portion,
a width of the projection part in the circumferential direction is larger than a width of the brush in the circumferential direction,
the commutator includes
  a plurality of commutator segments insulated from each other and arranged in a cylindrical state, and
  a connector portion that is an end of the respective commutator segments, the connector portion being located adjacent to the core of the armature in the axial direction, an armature coil of the armature being electrically connected to the connector portion,
the first connection plate has a spreading part which connects the sides of the slit with each other in the circumferential direction at a position on an outer side of an outer circumference of the connector portion in the radial direction, and
the spreading part extends over the slit in the circumferential direction, and is projected toward the core of the armature in the axial direction with respect to a surface of the first connection plate opposing the core of the armature.

10. A direct current motor having at least four poles comprising:
a commutator having a cylindrical shape on an axis of an armature;
a brush arranged on an outer circumference of the commutator;
a brush holder holding the brush and having insulating properties and;
a pressure component arranged in the brush holder to press the brush to the commutator;
a first connection plate having conductive properties and arranged adjacent to a core of the armature in an axial direction, all of plus side brushes or all of minus side brushes of the brush being electrically connected to the first connection plate through a respective pigtail; and
a second connection plate having conductive properties and arranged opposite from the core of the armature through the first connection plate in the axial direction, all of the minus side brushes or all of the plus side brushes being electrically connected to the second connection plate through a respective pigtail, wherein
the brush holder has an inner circumference opening opposing to the commutator in a radial direction, and an outer circumference wall surface that regulates an outer circumference position of the pressure component in the radial direction,
the first connection plate and the second connection plate are arranged in the axial direction in parallel without electrically contacting, the brush holder being held between the first connection plate and the second connection plate,
the first connection plate has a slit extending from the inner circumference or the outer circumference in the radial direction,
the brush holder has a core side position regulator engaged with the first connection plate to regulate a relative position,
the core side position regulator has
  a projection part projected toward the core of the armature in the axial direction, and
  a fitting groove portion defined on both sides of the projection part in a circumferential direction,
the relative position in the circumferential direction is regulated by an engagement between the projection part and the slit,
the relative position in the axial direction is regulated by an engagement between at least a part of sides of the slit in the circumferential direction and the fitting groove portion,
a width of the projection part in the circumferential direction is larger than a width of the brush in the circumferential direction,
the commutator includes
  a plurality of commutator segments insulated from each other and arranged in a cylindrical state, and
  a connector portion that is an end of the respective commutator segments, the connector portion being located adjacent to the core of the armature in the axial direction, an armature coil of the armature being electrically connected to the connector portion,
the first connection plate has a spreading part which connects the sides of the slit with each other in the circumferential direction at a position on an outer side of an outer circumference of the connector portion in the radial direction, and
the spreading part is bent to extend toward the core of the armature in the axial direction with respect to a surface of the first connection plate opposing the core of the armature.

* * * * *